3,405,149
DIRECT CLEAVAGE OF EPOXIDES TO PRODUCE ALDEHYDES
Gerhard Maerker and Elizabeth T. Haeberer, Philadelphia, Pa., assignors to the United States of America as represented by the Secretary of Agriculture
No Drawing. Filed Mar. 24, 1965, Ser. No. 442,555
12 Claims. (Cl. 260—405)

ABSTRACT OF THE DISCLOSURE

Upon contacting a compound containing at least one oxirane group, preferably dissolved in a water miscible solvent, with a concentrated aqueous periodic acid solution at ambient temperature, the oxirane group is converted rapidly to a product in which the carbon to carbon bond of the oxirane group has been cleaved and, in place of the oxirane group two aldehyde functions are formed. Ester functions are not hydrolyzed. Illustrative of the process, methyl 9,10-epoxystearate is converted to pelargonic aldehyde (nonanal) and methyl azelaaldehydate.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for preparing aldehydes. More particularly the invention relates to the cleavage of an oxirane group to produce aldehydes.

An oxirane group is a 1,2-epoxide function which may be either a naturally occurring function or one which may be synthesized by one of the several well-known methods.

Heretofore the conversion of epoxides to the shorter chain-length aldehyde was carried out by causing the epoxide to react with a carboxylic acid such as acetic acid, subjecting the resulting acyloxy-hydroxy compound to treatment with aqueous alcoholic base to form the dihydroxy derivative and treating the latter with periodic acid to form aldehydes. This multi-step procedure is time consuming, tedious, and subject to losses due to low yields, multiple side reactions and excessive handling. Under these conditions the conversion of epoxides to aldehydes is not practical since the aldehydes are obtained in low yield and low purity.

We have discovered a procedure whereby in a single step the epoxides are converted rapidly to aldehydes in very high yield. The products formed by breaking the carbon-carbon linkage of oxirane groups by the process of the present invention contain at least one aldehyde function per molecule. As applied to compounds containing other functional groups the present process represents a significant advancement in the preparation of di- and poly-functional compounds for use in preparing resins.

According to the present invention aldehydes are prepared by a process comprising oxidizing a compound containing at least one oxirane group with periodic acid.

In a preferred embodiment of the invention a compound containing at least one oxirane group is combined with a solution of periodic acid to provide a reaction mixture, the mixture is agitated at a temperature in the range of 0 to 100° C., typically at about 15 to 35° C., until the reaction is substantially complete, and an aldehydic reaction product is separated from the reaction mixture.

The oxirane group may be either terminal or non-terminal, and the molecule to be cleaved may contain one or more oxirane groups, each of which will give rise to two aldehyde functions when treated according to the specifications of our invention.

The epoxy compound which may be cleaved by the process of our invention may contain other non-reactive functional groups or substituents. Such functional groups or substituents may be hydroxyl, ester, carboxylic acid, and its salts, keto, cyano, acyl halide, amide, nitro, halogen, mercapto, sulfonic acid and its salts, ether, cyclic ether containing more than 3 ring atoms, and other functions. The epoxy compound may also contain reactive functional groups each of which may, for the purpose of this process, be considered to react as an additional oxirane group. Such reactive functional groups include 1,2-glycols, 1,2-amino alcohols, 1,2-diketones, $\alpha$-keto aldehydes, $\alpha$-hydroxy ketones, $\alpha$-hydroxy aldehydes, $\alpha$-amino ketones, $\alpha$-amino aldehydes, $\alpha$-hydroxy carboxylic acids and other functional groups which are known to give carbon-carbon bond cleavage when treated with periodic acid according to the process of our invention. The epoxy compound may be saturated or unsaturated and the oxirane function may be isolated in position or it may be conjugated with carbon-carbon unsaturation or with functional groups in which carbon is bonded to another atom by multiple bonds. Preferred are epoxy compounds which are saturated, or which are unsaturated and the multiple bond functional group is at least one saturated carbon atom removed from the oxirane group.

Our invention can be practiced in a wide variety of manners depending on the specific epoxy compound to be used, on the nature of the aldehydes produced, on the primary objective to be pursued and on the particular operating conditions chosen. In accordance with a preferred mode of operation, the epoxy compound is dissolved in a non-aqueous, non-reactive solvent prior to treatment. Solvents which may be chosen, if desired, include benzene, toluene, xylene, hexane, cyclohexane, heptane, ether, carbon tetrachloride, chloroform, methylene chloride, nitromethane, nitrobenzene, dichlorobenzene, tetrahydrofuran, 1,4-dioxane, dimethyl formamide, dimethyl sulfoxide, acetonitrile, acetone or any other non-aqueous, non-reactive compound which is suitable. Particularly preferred solvents are low-boiling, nonreactive, polar solvents such as acetone, dioxane, acetic acid, methyl acetate, ethyl acetate and the like.

In our preferred method, the solution of the epoxy compound is introduced into a suitable reaction vessel which may be provided with means for agitation of the reaction mixture, if desired. The periodic acid then is added to the epoxy compound solution, with external cooling of the mixture, if desired. Reverse addition can also be practiced if desired.

We prefer to carry out the process of our invention by adding the periodic acid as an aqueous solution, the concentration of which may be varied between 10% and 100%. If an aqueous solution of the acid is employed, the preferred range of acid concentration is between 20 and 70%. In many cases best results are obtained if the aqueous acid solution has an acid concentration of 25% to 45%.

The conversion of one oxirane group to two aldehyde functions consumes one molecule of periodic acid. A molar equivalent of periodic acid is therefore the minimum amount consistent with the achievement of high aldehyde yields. If desired, more than the stoichiometrically required amount of periodic acid may be used. As much as 500% or more excess of periodic acid can be used to advantage to shorten reaction time and to minimize the formation of by-products.

We further prefer to carry out the reaction in a temperature range of from about 0° C. to about 100° C., particularly, the temperature range of from about 15° C. to about 35° C. Higher temperatures and shorter times of contact of the reactants may be resorted to when it is desirable to accelerate the reaction.

When the epoxy compound is treated by our method with an excess amount of aqueous periodic acid, only a brief reaction period is required. The exact length of this period varies with the particular epoxy compound, the specific solvent chosen, the amount and concentration of periodic acid used, and the reaction temperature employed. Although brief reaction periods are preferred, longer periods may usually be used without detracting appreciably from optimum yield.

After the epoxy compound has been in contact with periodic acid for a brief period, the reaction is complete. Since we prefer to conduct the reaction in a solvent, the reaction products are usually obtained in solution or mixture with varying amounts of water, periodic acid, iodic acid and by-products. In the case that recovery of the anhydrous products is desired, this may be accomplished by any convenient method. If the solvent used was immiscible with water, then one method which may be employed to isolate the anhydrous product is to separate the aqueous acid phase from the organic phase and washing the latter with water or with an aqueous solution of any basic material, such as sodium hydroxide, potassium hydroxide, sodium carbonate, sodium bicarbonate, calcium carbonate, barium carbonate, magnesium carbonate, potassium carbonate, ammonia, amines or the like, drying the organic phase and then isolating the product from its solution by distillation, extraction, crystallization, steam distillation, adsorption or other means. Other suitable methods of recovery may also be used to isolate the anhydrous product from the reaction mixture.

If the solvent used in the execution of our invention is one which is miscible or partly miscible with water, the isolation of the anyhdrous product or products may also be effected by any means which are suitable to the operator, as for instance removal of the water and of acidic components by extraction, distillation, adsorption, ion exchange, crystallization, sublimation and the like. We prefer to execute our invention by extracting the desired products from the reaction mixture with a solvent which is poorly miscible with water and isolating the anhydrous product by washing, drying, and distilling the resulting solution.

Examples are presented to illustrate the practice of the invention and are not to be considered as limitations thereof.

Example 1

Periodic acid (1.25 g.) [$H_5IO_6$] was placed in a 25 ml. Erlenmeyer flask and dissolved in 2 ml. water. To this solution was added rapidly with stirring a solution of 1.0 g. methyl 9,10-epoxystearate in 10 ml. of purified 1,4-dioxane. The homogeneous mixture was agitated at room temperature (28° C.) for 20 minutes and then was poured into 100 ml. water. The resulting mixture was extracted with three 25 ml. portions of petroleum ether (B.P. 35–60° C.). The combined extracts were washed with 10 ml. of water, dried over sodium sulfate, filtered, and evaporated on the steam bath under nitrogen to a residue weight of 1.15 g. Infrared analysis of the residue showed absorption bands at 2700 cm.$^{-1}$ and 1710 cm.$^{-1}$ characteristic of aldehydes and absent in the starting material. GLC (gas-liquid chromatography) analysis showed two major peaks which were identified by comparison with authentic materials to be pelargonaldehyde [nonanal] (82.9% of theoretical yield) and methyl azelaaldehydate (90.6% of theoretical yield).

Example 2

To 1.1 g. periodic acid in 2 ml. water was added a solution of 1.0 g. methyl epoxystearate in 15 ml. 1,4-dioxane, and the solution was agitated at room temperature for 19 hours. The reaction mixture was poured into 150 ml. water and worked up as described for Example 1 to obtain 1.44 g. product, which, by GLC analysis, contained 43% solvents (dioxane and petroleum ether), 28% pelargonaldehyde and 27% methyl azelaaldehydate.

Example 3

To a solution of 1.0 g. methyl 12,13-epoxy-9-octadecenoate (purity by oxirane assay 91.7%) dissolved in 10 ml. purified 1,4-dioxane was added a solution of 1.25 g. periodic acid in 2 ml. water. The mixture was stirred at room temperature for 30 minutes and then poured into 100 ml. water and worked up as described for Example 1 to obtain 1.34 g. of product. The latter mixture was shown by GLC to contain hexaldehyde, dioxane and petroleum ether in addition to two peaks of longer retention time assigned to methyl 11-formyl-9-undecenoate and methyl 11-formyl-10-undecenoate. The infrared spectrum showed absorption at 3045 cm.$^{-1}$ (double bond) 2745 cm.$^{-1}$ (aldehyde) 1700 cm.$^{-1}$ and 1675 cm.$^{-1}$ (conjugated aldehyde). HBr titration demonstrated absence of oxirane oxygen.

Example 4

A solution of 1.2 g. phenyl 9,10-epoxystearate (79% pure; oxirane oxygen, 3.38%) in 10 ml. 1,4-dioxane was treated with a solution of 1.25 g. periodic acid in 2 ml. water by stirring the mixture at room temperature for 1 hour. The reaction mixture was worked up as described for Example 1 to obtain 1.52 g. yellow oil. GLC analysis of the product demonstrated the presence of pelargonaldehyde as a major product. A later major peak was assigned to phenyl azelaaldehydate. Infrared analysis indicated the presence of aldehyde groups and the absence of oxirane oxygen. HBr titration demonstrated that only 4.5% of the original oxirane oxygen was still present.

Example 5

To a solution of 1.10 g. methyl 12-methoxy-9,10-epoxystearate (93% pure; oxirane oxygen, 4.33%) in 10 ml. 1,4-dioxane was added a solution of 1.25 g. periodic acid in 2 ml. water, and the mixture was stirred at room temperature for 40 minutes. The product was worked up as described in Example 1 to obtain 1.19 g. yellow oil. GLC analysis of the latter indicated the presence of two major components: methyl azelaaldehydate and another peak assigned to 3-methoxypelargonaldehyde. Infrared analysis indicated the presence of aldehydes. HBr titration incated the presence of 11% unreacted material.

Example 6

A solution of 1.0 g. methyl 12-hydroxy-9,10-epoxystearate (94.5% pure; oxirane oxygen, 4.6%) in 10 ml. 1,4-dioxane was treated with 1.25 g. periodic acid dissolved in 2 ml. water. The solution was stirred at room temperature for 15 minutes and worked up as describe in Example 1, to obtain 1.02 g. oil. GLC analysis indicated the presence of methyl azelaaldehydate and another major peak assumed to be 3-hydroxypelargonaldehyde. Infrared analysis indicated the presence of aldehydes. HBr titration indicated that 80% of the starting material oxirane oxygen had disappeared.

Example 7

To a solution of 0.5 g. methyl 9,10,12,13-diepoxystearate (95.7% pure; oxirane oxygen 9.38%) in 12 ml. 1,4-dioxane added a solution of 1.2 g. periodic acid in 2 ml. water. The mixture was stirred for 30 minutes at room temperature and then poured into 150 ml. water and worked up in the usual manner. Obtained 0.38 g. product consisting mostly of some solvent, hexaldehyde and methyl azelaaldehydate.

Example 8

To a solution of 1.0 g. cyclohexene oxide (95.7% pure) in 10 ml. 1,4-dioxane added a solution of 3.75 g. periodic acid dissolved in 6 ml. water. The reaction mixture was stirred, with initial cooling, at room temperature for 15 minutes and after the usual work-up yielded 0.84 g. oil. The latter was shown by GLC to contain no starting material but a new product assumed to be adipic dialdehyde. Infrared analysis indicated disappearance of oxirane oxygen and appearance of aldehyde absorption peaks.

Example 9

A solution of 1.01 g. pentaerythritol tetra-9,10-epoxystearate in 10 ml. 1,4-dioxane was treated with a solution of 1.25 g. periodic acid as described in Example 1, with the exceptions that the reaction time was extended to 1 hour and petroleum ether extraction was followed by diethylether extractions. The cleavage products (1.64 g.) were analyzed by GLC, which indicated the presence only of solvent and pelargonaldehyde. Infrared analysis showed aldehyde absorption peaks (2725 cm.$^{-1}$, 1740 cm.$^{-1}$, 1725 cm.$^{-1}$). Evaporative removal of solvents and volatile aldehydes gave a non-volatile residue (0.57 g.) which was non-volatile on GLC under the conditions applied, and the infrared spectrum of which showed strong aldehyde absorption in the C—H stretching and carbonyl regions.

Example 10

A solution of 0.70 g. epoxidized soybean oil (oxirane oxygen, 7.20%) in 10 ml. 1,4-dioxane was added to a solution of 1.25 g. periodic acid in 2 ml. water and the mixture stirred for 1 hour at room temperature. The reaction mixture was poured into 100 ml. water and worked up as described for Example 1. The oil (1.31 g.) thus obtained was shown, by GLC, to contain hexaldehyde, nonanal and solvent. Infrared demonstrated the presence of aldehydes. Reextraction of the aqueous phase with ether led to the isolation of a second oil (0.97 g.) which also showed aldehyde absorption in the infrared. Combination of the two oils and evaporative removal of volatile solvents and aldehyde gave a residue (0.54 g.) with strong infrared absorption peaks at 1720 cm.$^{-1}$ and 1735 cm.$^{-1}$, indicative of aldehydes.

Example 11

To a solution of 1.0 g. methyl 9,10-epoxystearate in 10 ml. glacial acetic acid was added a solution of 1.25 g. periodic acid and the resulting solution was stirred at room temperature for 15 minutes. The work-up was the same as that described for Example 1. The product (1.42 g.) was shown, by GLC analysis, to contain pelargonaldehyde and methyl azelaaldehydate but not starting material. Infrared analysis demonstrated the presence of aldehydes.

Example 12

To a solution of 1.0 g. methyl 9,10-epoxystearate in 10 ml. diethyl ether was added a solution of 1.25 g. periodic acid in 2 ml. water, and the resulting solution was stirred at room temperature for 1 hour. The work-up was the same as that described for Example 1. The product (1.38 g.) was shown by GLC analysis to contain solvent, pelargonaldehyde, methyl azelaldehydate and starting material. Infrared analysis desmonstrated the presence of aldehydes.

Example 13

To a solution of 1.0 g. methyl 9,10-epoxystearate in 10 ml. methylacetate was added a solution of 1.25 g. periodic acid in 2 ml. water, and the resulting solution was stirred at room temperature for 1 hour. The work-up was the same as that described for Example 1. The product (1.47 g.) was shown by GLC to contain solvent, pelargonaldehyde, methyl azelaaldehydate and essentially no starting material. The infrared absorption spectrum of the product contained strong peaks for aldehyde.

Example 14

To a solution of 1.0 g. methyl 9,10-epoxystearate in 10 ml. nitromethane was added a solution of 1.25 g. periodic acid in 2 ml. water and the resulting solution was stirred at room temperature for 1 hour. The work-up of the sample was the same as that described for Example 1. The product (1.24 g.) was analyzed by GLC. Its chromatogram contained peaks for pelargonaldehyde and methyl azelaaldehydate. Infrared absorption peaks indicated the presence of aldehyde.

The use of esters as starting materials in some of the foregoing examples is not to be construed as a limiting feature, but will be recognized by those skilled in the art as a means of facilitating separation and identification of the products.

We claim:

1. A process for preparing aldehydes which comprises oxidizing an oxirane-containing compound from the group consisting of 9,10-epoxystearic acid, 12,13-epoxy-9-octadecenoic acid, 9,10,12,13 - diepoxystearic acid, cyclohexene oxide, methyl 9,10-epoxystearate, methyl 12,13-epoxy-9-octadecenoate, methyl 12-methoxy - 9,10 - epoxystearate, phenyl 9,10-epoxystearate, and methyl 9,10,12,13 - diepoxystearate, said oxirane-containing compound being dissolved in a nonaqueous, inert solvent, with a concentrated aqueous solution containing at least 10% periodic acid.

2. The process of claim 1 wherein the oxirane-containing compound oxidized is 9,10-epoxystearic acid.

3. The process of claim 1 wherein the oxirane-containing compound oxidized is 12,13 - epoxy - 9 - octadecenoic acid.

4. The process of claim 1 wherein the oxirane-containing compound oxidized is 9,10,12,13-diepoxystearic acid.

5. The process of claim 1 wherein the oxirane-containing compound oxidized in cyclohexene oxide.

6. A process comprising oxidizing a member of the group consisting of the methyl and phenyl esters of 9,10-epoxystearic acid, dissolved in a nonaqueous inert solvent, with a concentrated aqueous solution containing at least 10% periodic acid and separating pelargonaldehyde and an ester of the group consisting of methyl and phenyl azelaaldehydate.

7. The process of claim 6 wherein the compound oxidized is methyl 9,10-epoxystearate and the ester separated is methyl azelaaldehydate.

8. The process of claim 6 wherein the compound oxidized is phenyl 9,10-epoxystearate and the ester separated is phenyl azelaaldehydate.

9. A process comprising oxidizing methyl 12,13-epoxy-9-octadecenoate dissolved in a nonaqueous inert solvent with a concentrated aqueous solution containing at least 10% periodic acid and separating hexaldehyde, methyl 11-formyl-9-undecenoate, and 11-formyl-10-undecenoate from the reaction mixture.

10. A process comprising oxidizing methyl 12-methoxy-9,10-epoxystearate dissolved in a nonaqueous inert solvent with a concentrated aqueous solution containing at least 10% periodic acid and separating methyl azelaaldehydate and 3-methoxy-pelargonaldehyde from the reaction mixture.

11. A process comprising oxidizing methyl 9,10,12,13-diepoxystearate dissolved in a nonaqueous inert solvent with a concentrated aqueous solution containing at least 10% periodic acid and separating hexaldehyde and methyl azelaaldehydate from the reaction mixture.

12. A process comprising oxidizing cyclohexene oxide dissolved in a nonaqueous inert solvent with a concentrated aqueous solution containing at least 10% periodic acid and separating adipic dialdehyde from the reaction mixture.

References Cited

Buist et al., J. Chem. Soc. (London), 1959, pp. 743–8.
Eastham et al., Can. J. Res., vol. 28B (1950), pp. 264–7.
Gunstone, J. Chem. Soc. (London), 1954, pp. 1611–6.
Jackson, Organic Reaction, vol. 2 (1944) pp. 341–57.
King, J. Chem. Soc. (London), 1938, pp. 1826–8.

NICHOLAS S. RIZZO, *Primary Examiner.*
R. GALLAGHER, *Assistant Examiner.*